(12) United States Patent
Fan

(10) Patent No.: US 10,571,621 B2
(45) Date of Patent: Feb. 25, 2020

(54) LIGHT GUIDE PLATE AND DISPLAY DEVICE

(71) Applicant: Shenzhen China Star Optoelectronics Technology Co., Ltd., Guangdong (CN)

(72) Inventor: Yong Fan, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 735 days.

(21) Appl. No.: 14/779,213

(22) PCT Filed: Aug. 18, 2015

(86) PCT No.: PCT/CN2015/087347
§ 371 (c)(1),
(2) Date: Sep. 22, 2015

(87) PCT Pub. No.: WO2017/028200
PCT Pub. Date: Feb. 23, 2017

(65) Prior Publication Data
US 2017/0254947 A1 Sep. 7, 2017

(30) Foreign Application Priority Data
Aug. 14, 2015 (CN) ............ 2015 1 0501290

(51) Int. Cl.
*F21V 8/00* (2006.01)
(52) U.S. Cl.
CPC ......... *G02B 6/0055* (2013.01); *G02B 6/0043* (2013.01); *G02B 6/0065* (2013.01); *G02B 6/0093* (2013.01)

(58) Field of Classification Search
CPC .. G02B 6/0055; G02B 6/0043; G02B 6/0065; G02B 6/0093
USPC ......................................... 362/606
See application file for complete search history.

(56) References Cited

U.S. PATENT DOCUMENTS

| | | |
|---|---|---|
| 4,801,184 A | 1/1989 | Revelli |
| 8,659,714 B2 | 2/2014 | Jeong et al. |
| 8,987,757 B2 | 3/2015 | Moon et al. |
| 9,170,453 B2 | 10/2015 | Shin et al. |
| 2008/0151574 A1* | 6/2008 | Park ............ G02B 6/0055 362/612 |
| 2011/0292685 A1 | 12/2011 | Park et al. |

(Continued)

FOREIGN PATENT DOCUMENTS

| | | |
|---|---|---|
| CN | 1388705 A | 1/2003 |
| CN | 1791810 A | 6/2006 |

(Continued)

OTHER PUBLICATIONS

International Search Report for PCT/CN2015/087347, Completed by the Chinese Patent Office, dated May 11, 2016, 11 Pages.

*Primary Examiner* — Elmito Breval
(74) *Attorney, Agent, or Firm* — Mintz Levin Cohn Ferris Glovsky and Popeo, P.C.; Steven M. Jensen

(57) ABSTRACT

A light guide plate including a main body of the light guide plate, and a buffer layer and a reflective layer integrally formed on a lower surface of the main body in sequence, and an upper surface of the main body is provided with a plurality of scattering netted dots. The present disclosure further provides a display device.

9 Claims, 2 Drawing Sheets

(56) References Cited

U.S. PATENT DOCUMENTS

| | | | |
|---|---|---|---|
| 2013/0107568 A1* | 5/2013 | Sato | G02B 6/0095 362/602 |
| 2013/0135536 A1* | 5/2013 | Kuromizu | G02B 6/0068 348/739 |
| 2013/0258707 A1* | 10/2013 | Iwasaki | G02B 6/0041 362/607 |
| 2013/0301294 A1* | 11/2013 | Lai | B29D 11/00663 362/609 |

FOREIGN PATENT DOCUMENTS

| | | |
|---|---|---|
| CN | 101669045 A | 3/2010 |
| CN | 101680975 A | 3/2010 |
| CN | 201680234 | 12/2010 |
| CN | 102262261 | 11/2011 |
| CN | 102544277 | 7/2012 |
| CN | 102544292 | 7/2012 |
| CN | 102866535 | 1/2013 |

* cited by examiner

LIGHT GUIDE PLATE AND DISPLAY DEVICE

CROSS-REFERENCE TO RELATED APPLICATION

This application is the U.S. national phase of PCT Application No. PCT/CN2015/087347 filed on Aug. 18, 2015, which claims priority to CN Patent Application No. 201510501290.2 filed on Aug. 14, 2015, the disclosures of which are incorporated in their entirety by reference herein.

BACKGROUND OF THE INVENTION

1. Field of the Invention

The present disclosure relates to display technical field, and more particularly to a light guide plate and a display device.

2. The Related Arts

A main material of Light guide plate is optical acrylic Polymethyl Methacrylate (PMMA) Sheet, and its chemical name is methyl methacrylate, and the specific gravity thereof is 1190 kg per cubic meter. Transparent acrylic sheet is widely used since it has very high transmittance and strong anti-impact ability. The currently produced acrylic sheets are different in quality, because they are produced by different manufacturers using different processes, especially the reproduced sheets are inexpensive but poor in transparency due to yellowing. The light guide plate made of this kind of material has low hardness, thus a metal backboard may be used to support the light guide plate at its bottom, which adds the cost of components matched with the light guide plate and the entire thickness, and is not beneficial to the thinness design of the display device.

SUMMARY OF THE INVENTION

Considering defects exist in the prior art, the present disclosure provides a light guide plate and a display device which lowers the cost of components the light guide plate and entire thickness.

To achieve the above purposes, the present invention adopts the following technical solution:

a light guide plate includes a main body of the light guide plate, and a buffer layer and a reflective layer integrally formed on a lower surface of the main body in sequence, and an upper surface of the main body is provided with a plurality of scattering netted dots.

The main body of the light guide plate is made of a glass.

The buffer layer is made of one of aluminum oxide, nickel or chromium.

The reflective layer includes a first reflective layer adhering closely to the lower surface of the buffer layer, and the first reflective layer is a metal layer.

The reflective layer further includes a second reflective layer adhering closely to lower surface of the first reflective layer, and the second reflective layer includes a plurality of dielectric layers made of materials having two different refractive indexes.

The dielectric layer of the second reflective layer is formed by alternately stacking a $SiO_2$ layer and a $TiO_2$ layer.

Alternatively, the dielectric layer of the second reflective layer is formed by alternately stacking a $MgF_2$ layer and a ZnS layer.

The guide light plate further includes a protective layer adhering closely to the lower surface of the reflective layer.

The protective layer is a material of $SiO_2$.

The present disclosure provides a display device including an optical film set, a display panel and the above mentioned light guide plate.

The light guide plate of the present disclosure is formed integrally with a main body and a reflective layer, and the main body of the light guide plate is made of glass material, thus the intensity of the light guide plate can be enhanced effectively, thereby eliminating a metal back plate structure matched with the light guiding plate in the display device, which is beneficial for lowering cost of components associated with the guide light plate and thinning of the product. Meanwhile, the reflective layer consists of a metal layer having reflection function and a dielectric layer coated on the bottom of the metal layer, such that the light guide plate has high reflectivity.

DETAILED DESCRIPTION OF THE PREFERRED EMBODIMENTS

Figure 1:
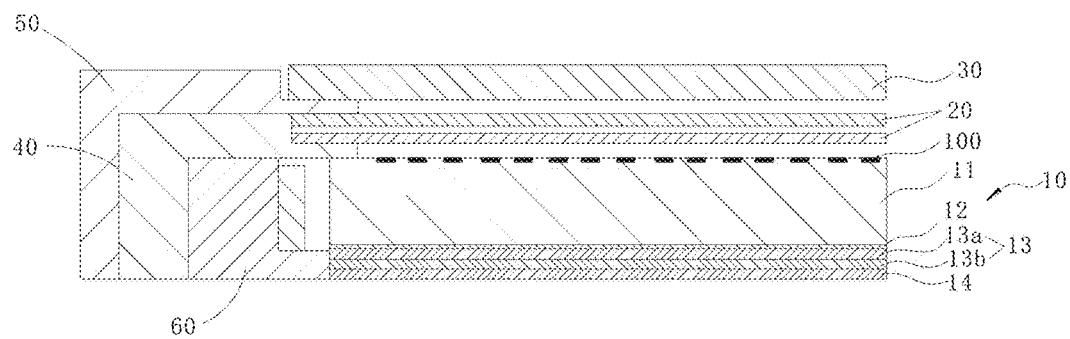
FIG. 1 is a schematic diagram of a structure of a display device according to an embodiment of the present disclosure.

In order for a clearer understanding of the purpose, technical solutions and the advantages of the present disclosure, the present disclosure will be explained in detail by referring to the drawings and exemplary embodiments. It should be understood that the certain exemplary embodiments described herein are only used to explain the present disclosure, but are not limited thereto.

Referring to FIG. 1, the light guide plate of the present disclosure includes a main body 11 of the light guide plate, and buffer layer 12, a reflective layer 13 and a protective layer 14 integrally formed on a lower surface of the main body 11 in sequence from top to bottom, and an upper surface of the main body 11 is provided with a plurality of scattering netted dots.

The main body 11 of the light guide plate is a glass, several scattering netted dots 100 are formed on an upper surface of the glass in an array through laser drilling, and the light emitted through the upper surface as a light exiting surface and scattered by the scattering netted dots 100 may have uniform light emitting and good consistency.

The buffer layer 12 is one of aluminum oxide, nickel or chromium, and the reflective layer 13 includes a first reflective layer 13a and a second reflective layer 13b adhering closely to the lower surface of the buffer layer 12. The first reflective layer 13a is a metal layer, and the second reflective layer 13b is a dielectric layer. Preferably, the first reflective layer 13a is a sliver reflective layer coated or plated on the lower surface of the buffer layer 12, and due to the existence of the buffer layer, the first reflective layer 13a can be adhered on the main body 11 of the light guide plate so as to avoid releasing. The second reflective layer 13b includes a plurality of dielectric layers made of materials having two different refractive indexes, and the dielectric layer is formed by stacking two materials having high and low refractive indexes. Due to an existence of the first reflective layer, the number of the dielectric layers may be relatively small, preferably is 3-20 layers, such as 3 layers, 8 layers, 16 layers, 20 layers or the like. The dielectric layer of the second reflective layer 13b is made of combination of reflective layers with high/low refraction indexes, such as a combination of $SiO_2$ layer and $TiO_2$ layer, and a combination of $MgF_2$ layer and ZnS layer. Through the above configuration, the high refractive index material and the low refractive index material are arranged alternately in sequence from top to bottom to form a composite reflection structure, thus the light passed through the first reflective layer 13a can be reflected back from the second reflective layer 13b, thereby greatly enhancing the overall brightness and optical utilization of the light guide plate 10.

Furthermore, the protective layer 14 is made of $SiO_2$ material with ½ wavelength and is coated on the bottom of the second reflective layer 13b, thus can be used to protect the reflective layer from being damaged.

The light guide plate 10 of the embodiment of the present disclosure can be applied to various display devices with ultra-thin size. In particular, the display device includes a light guide plate 10, an optical film set 20, a display panel 30, a middle frame 40, a front frame 50 and a light source module 60. The light source module 60 is a LED light source, and is integrated with a heat sink panel and placed at a side of light incident side of the light guide plate 10. The middle frame 40 receives the light guide plate 10 and the light source module 60 therein. The optical film set 20 is a multi-layer composite optical film and is tightly fitted to the upper surface of the middle frame 40 to scatter and deflect the light emitted from the light exiting surface of the light guide plate, to thereby forming a predetermined light extraction effect. The front frame 50 covers the middle frame 40 to protect the middle frame 40 and the components in the middle frame. The display panel 30 is mounted on the upper surface of the front frame 50 by dispensing, pasting or the like. More particularly, the upper surface close to the inner side of the middle frame 40 is provide with a round of steps having the same height as that of the optical film set 20, and an end of the optical film set 20 is embedded in and tightly fitted to the steps, and the inner surface of the front frame 50 is tightly fitted to the upper surfaces of the optical film set 20 and the middle frame 40, such that the entire structure of the display device is more compact and thinner in size.

Figure 2:
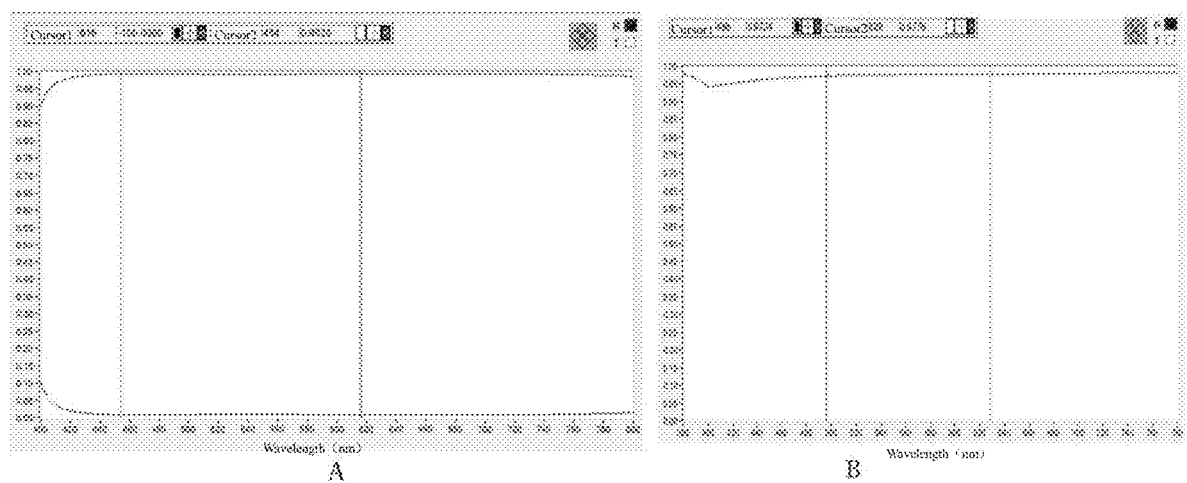
FIG. 2 is a software simulation result diagram of reflectivity of incident light having different wavelengths of the light guide plate at an incident angle of 0° according to an embodiment of the present disclosure.
Figure 3:
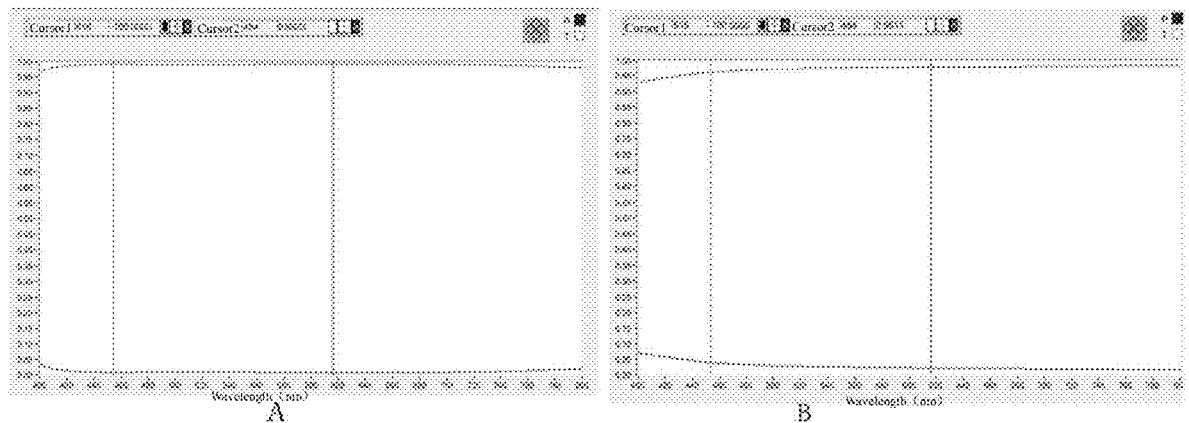
FIG. 3 is a software simulation result diagram of reflectivity of incident light having different wavelengths of the light guide plate at an incident angle of 30° according to an embodiment of the present disclosure.
Figure 4:
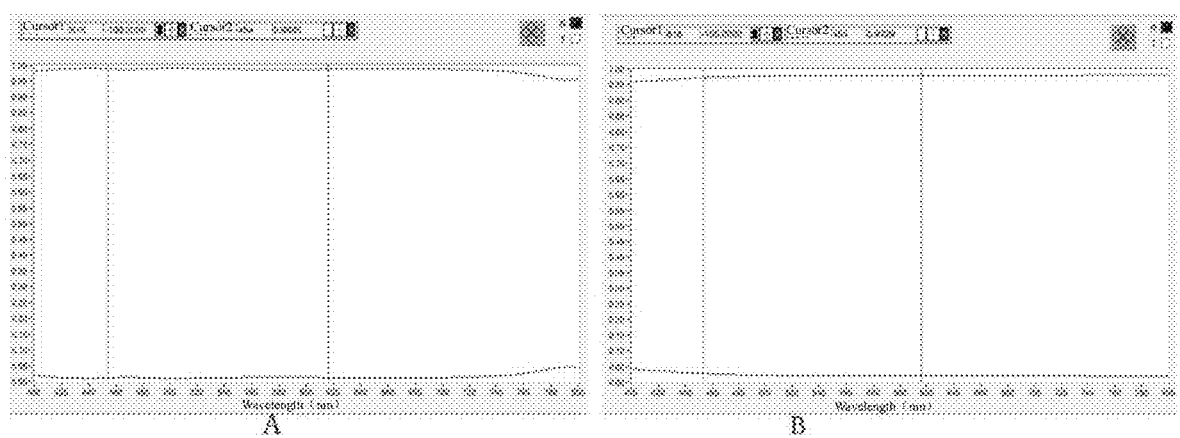
FIG. 4 is a software simulation result diagram of reflectivity of incident light having different wavelengths of the light guide plate at an incident angle of 70° according to an embodiment of the present disclosure.

FIGS. 2-4 are refraction index comparison diagrams of a light guide plate having three dielectric layers (Sample A in the figures) and a light guide plate composed of coating sliver on bottom of the glass (Sample B in the figures) at different incident angles and under conditions of different incident wavelength according to embodiments of the present disclosure. The incident light source is a LED light source, and the incident surface is the glass surface on top of the guide light plate.

As shown in FIG. 2, when the incident angle is 0°, the average reflective index of the light of Sample A within a wavelength range of 435 nm-680 nm reaches to 99.28%, while under the same condition, the average reflective index of light of Sample B is 97.76%, thus it can be seen that the reflective index of the light guide plate (i.e. Sample A) is increased by 1.52% compared with the sliver coated light guide plate (i.e. Sample B).

As shown in FIG. 3, when the incident angle is 30°, the average reflective index of the light of Sample A within a wavelength range of 435 nm-680 nm reaches to 99.23%, while under the same condition, the average reflective index of light of Sample B is 96.11%, thus it can be seen that the reflective index of the light guide plate (i.e. Sample A) is increased by 3.12% compared with the sliver coated light guide plate (i.e. Sample B).

As shown in FIG. 4, when the incident angle is 70°, the average reflective index of the light of Sample A within a wavelength range of 435 nm-680 nm reaches to 98.85%, while under the same condition, the average reflective index of light of Sample B is 97.29%, thus it can be seen that the reflective index of the light guide plate (i.e. Sample A) is increased by 1.56% compared with the sliver coated light guide plate (i.e. Sample B).

Therefore, the light guide plate according to the embodiment of the present disclosure achieves better reflection effect compared with common light guide plate and the reflective layer of which the glass surface is coated with sliver, and it is not only good for ultra-thin of the display device, also can improve light utilization and brightness of the light guide plate obviously, and the display effect of the display device may be more excellent.

The above statements are only the specific embodiments of the present application, it should be noted that, to those ordinary skilled in the art, several improvements and modifications can be made without departing from the principle of the present application, also those improvements and modifications polish should be considered as being within protection scope of the present application.

What is claimed is:

1. A display device, comprising:
    a light guide plate, comprising a main body having a light incidence surface on a side surface thereof, and a buffer layer and a reflective layer integrally formed on a lower surface of the main body in sequence, wherein the main body includes a plurality of scattering netted dots on an upper surface thereof;
    a light source disposed adjacent to the light incidence surface of the light guide plate;
    a middle frame within which the light guide plate and the light source are received;
    an optical film set disposed on an upper surface of the middle frame;
    a front frame within which the middle frame and the optical film set are received; and
    a display panel disposed on an upper surface of the front frame,
    wherein the main body of the light guide plate is made of glass,
    wherein no backing plate is formed in the middle frame or in the front frame, and
    wherein the light guide plate and the light source are directly coupled to the middle frame.

2. The display device of claim 1, wherein the buffer layer is made of one of aluminum oxide, nickel or chromium.

3. The display device of claim 1, wherein the reflective layer comprises a first reflective layer adhering closely to the lower surface of the buffer layer, and the first reflective layer is a metal layer.

4. The display device of claim 3, wherein the reflective layer further comprises a second reflective layer adhering closely to a lower surface of the first reflective layer, and the second reflective layer comprises a plurality of dielectric layers made of materials having two different refractive indexes.

5. The display device of claim 4, wherein the dielectric layer of the second reflective layer is formed by alternately stacking a $SiO_2$ layer and a $TiO_2$ layer.

6. The display device of claim 4, wherein the dielectric layer of the second reflective layer is formed by alternately stacking a $MgF_2$ layer and a ZnS layer.

7. The display device of claim 3, wherein the guide light plate further comprises a protective layer adhering closely to the lower surface of the reflective layer.

8. The display device of claim 7, wherein the protective layer is made of $SiO_2$ material.

9. A display device, comprising:
- a light guide plate, wherein the light guide plate comprises a main body of the light guide plate having a light incident surface on a side surface thereof, and a buffer layer and a reflective layer integrally formed on a lower surface of the main body in sequence, and wherein the main body includes a plurality of scattering netted dots on an upper surface thereof, and the reflective layer comprises a first reflective layer adhering closely to a lower surface of the buffer layer, and the first reflective layer is a metal layer;
- a light source disposed adjacent to the light incidence surface of the light guide plate;
- a middle frame within which the light guide plate and the light source are received;
- an optical film set disposed on an upper surface of the middle frame;
- a front frame within which the middle frame and the optical film set are received; and
- a display panel disposed on an upper surface of the front frame, wherein the main body of the light guide plate is made of glass, wherein no backing plate is formed in the middle frame or in the front frame, and wherein the light guide plate and the light source are directly coupled to the middle frame.

* * * * *